United States Patent [19]
Woodcock

[11] 3,755,757
[45] Aug. 28, 1973

[54] HIGH EFFICIENCY ERBIUM GLASS LASER

[75] Inventor: Richard F. Woodcock, South Woodstock, Conn.

[73] Assignee: American Optical Corporation, Southbridge, Conn.

[22] Filed: June 23, 1972

[21] Appl. No.: 265,839

[52] U.S. Cl. .............................................. 331/94.5
[51] Int. Cl. ............................................... H01s 3/16
[58] Field of Search ...................... 331/94.5; 330/4.3

[56] References Cited
UNITED STATES PATENTS
3,590,004  6/1971  Woodcock ........................ 331/94.5

*Primary Examiner*—William L. Sikes
*Attorney*—William C. Nealon, Bernard L. Sweeney et al.

[57] ABSTRACT

An optimized erbium glass laser device for utilization in the range from 50 to 100 millijoules (mJ) output power is defined. This device includes a concentration of $Er_2O_3$ in the core of a clad glass laser rod in the range of about 0.20–0.25 weight percent in combination with a $Yb_2O_3$ concentration of approximately 15 weight percent in a silicate base glass. The optimal cladding gass composition contains approximately 4–5 weight percent each of $Nd_2O_3$ and $Yb_2O_3$.

7 Claims, 1 Drawing Figure

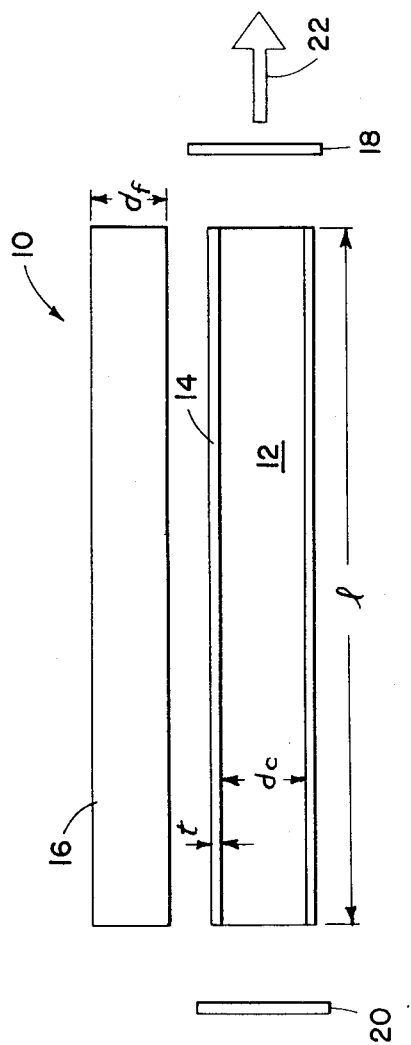

HIGH EFFICIENCY ERBIUM GLASS LASER

BACKGROUND OF THE INVENTION

This invention is related to glass lasers and is more particularly concerned with a novel optimized configuration for an erbium glass laser device capable of operating in the output power range from 50 to 100 mJ at higher overall efficiencies than were previously obtainable with erbium glass laser devices operating in this output power range.

Trivalent erbium ions disposed in a glass host material characteristically emit laser energy at a wavelength of approximately 1.54 micrometers. One distinct advantage which adheres to the operation of a laser at this wavelength is that the human eye is quite absorbant to energy at this wavelength, therefore, natural protection against the burning of the retina is inherent in the erbium laser. This danger is less severe than with nearly all other known laser materials.

Erbium has, since its discovery as a laser material, proven to be a rather difficult material with which to acquire practical overall output efficiencies when compared with other available laser materials. Since trivalent erbium has very few absorption bands in the visible spectrum where the vast majority of the optical energy from a typical flashlamp is concentrated, it has proven to be impossible, practically speaking, to pump the erbium ions directly into a metastable upper energy level without the use of additional sensitizer ions. It was discovered early that the combination of trivalent neodymium and trivalent ytterbium ions could be used advantageously as sensitizer ions for pumping the trivalent erbium ions into that metastable energy level. This cominbation is disclosed and described in detail in U.S. Pat. 3,533,956 to Snitzer. It is also shown therein that if the trivalent neodymium ions are contained in the same homogeneous matrix material as the trivalent erbium ions that concentration quenching of the erbium ions occurs. In other words, instead of radiatively decaying to the same lower energy state, the energy is transferred to a nearby trivalent neodymium ion. Therefore, the neodymium ion concentration necessarily was required to be very low in an erbium laser material in order to keep the neodymium and erbium ions separated sufficiently to prevent concentration quenching. This, of course, severely restricted the effect desired, the absorption of the optical pumping energy in the visible portion of the spectrum by the neodymium ions for transfer through the ytterbium ions tothe erbium ions.

The aforementioned concentration quenching problem in erbium laser materials was successfully solved in U.S. Pat. 3,590,004. It was found that if the trivalent neodymium sensitizer ions were placed in a separate cladding layer surrounding the laser rod containing the trivalent erbium ions, that sufficient separation between the erbium and neodymium ions existed to substantially prevent concentration quenching. Hence, the trivalent neodymium ion concentration could be greatly increased thereby substantially enhancing the ability to pump the trivalent erbium ions into an excited state.

Regardless, even with this advance, the overall efficiencies of erbium glass laser devices has remained quite low in comparison to devices incorporating other laser materials such as neodymium doped glass. This low efficiency has prevented the utilization of erbium glass laser devices to any significant extent although, as aforementioned, an important and unique advantage does naturally adhere to the erbium glass laser device. An ideal mode of utilization for an erbium glass laser device is to serve as the transmitting element in an optical radar system. However, due to the lower overall efficiency of the erbium glass laser material, such a device has been impractical due to the high capacity of the power supply necessary to acquire sufficient output power, 50 to 100 mJ, to make such an optical radar device effective. Designers and users alike have not been willing to sacrifice the greater overall efficiencies of other laser materials for the safety of the erbium device.

SUMMARY OF THE INVENTION

Accordingly, it is an object of the present invention to provide an optimized erbium glass laser material which will allow higher efficiencies to be derived from devices incorporating the erbium glass laser material therein.

Another object of the invention is to ascertain the optimal resonant cavity configuration and relative sizes of the various components to further optimize the operation of the erbium glass laser device.

Briefly, the invention in its broadest aspect comprises an erbium glass laser device emitting laser energy at a wavelength of approximately 1.54 micrometers of the type formed of a silicate base glass core rod surrounded by a tube of silicate base cladding glass. The core glass includes trivalent erbium active laser ions and trivalent ytterbium sensitizer ions. The cladding glass contains trivalent ytteribium and trivalent neodymium sensitizer ions. optical pumping means is associated with the clad glass laser rod. The improvement in this device comprises the concentration of $Er_2O_3$ in the glass core being in the range from 0.20 to 0.25 weight percent, the concentration of $Yb_2O_3$ in the glass core being approximately 15 weight percent, and the concentration of $Nb_2O_3$ and $Yb_2O_3$ in the glass cladding each being in the range from 4.0 to 5.0 weight percent.

Further objects, advantages, and features of the invention will be apparent in the arrangement and construction of the constituent parts, in detail, as set forth in the following specification taken together with the accompanying drawing.

DESCRIPTION OF THE DRAWING

In the drawing, the single FIGURE is a schematic representation of a laser device includng a clad erbium laser rod according to the present invention.

DETAILED DESCRIPTION OF THE PREFERRED EMBODIMENTS

Referring to the single FIGURE of the drawing, wherein there is shown an erbium glass laser device 10 which includes a glass laser rod 12 having a glass cladding 14 therearound and an associated flashlamp 16. The laser rod 12 is, in this embodiment, disposed in a resonant laser cavity formed by mirrors 18 and 20 which are disposed at opposite ends of the rod 12. One of these reflectors, in this case denoted by reference numeral 18, has a reflectance somewhat less than 100 percent. This refelctor serves as the output reflector for the resonant laser cavity through which the amplified laser energy is emitted as represented by arrow 22.

As was stated hereinabove, prior art erbium glass laser devices although configured so as to appear substantially identical to that shown in the drawing, have been unable to attain practical overall efficiencies. It has been discovered that by restricting the trivalent rare earth oxide content within the core and cladding glass materials to rather narrow ranges, that the overall efficiency of the device may be improved considerably. The optimum concentration of $Er_2O_3$ in the glass of the core is in the range from 0.20 to 0.25 weight percent. Associated with this erbium ion concentration, it has been found to be beneficial to limit the concentration of the sensitizer ions within the core to approximately 15 weight percent of $Yb_2O_3$. At this range of concentration, it has been found that the best blend of lower laser threshold with slope efficiency is attained. The optimal concentrations are specific to silicate base glasses for both the core and cladding It has also been determined that if the concentration of trivalent neodymium ions in the form of $Nd_2O_3$ and trivalent ytterbium ions as $Yb_2O_3$ in the glass cladding are each present in the range from 4.0 to 5.0 weight percent, that the efficiency of energy absorption from a typical optical pumping energy source such as flashlamp 16 is most efficiently absorbed and transferred to the active trivalent erbium ions within the laser core.

In the preferred embodiment of the present invention, both the core and cladding glass are formed by doping the aforementioned rare earth oxides into a silicate base glass which is utilized for both the core and cladding and whose composition is essentially as given below in weight percent:

| | |
|---|---|
| $SiO_2$ | 71.4 |
| $Na_2O$ | 7.6 |
| $K_2O$ | 11.6 |
| BaO | 5.1 |
| $Al_2O_3$ | 1.6 |
| ZnO | 1.6 |
| $Li_2O$ | 1.1 |

In addition, in the preferred embodiment, the cladding glass also contains $Y_2O_3$ in a concentration of approximately 5 weight percent. The yttrium oxide is utilized to balance the thermal expansion rates between the core and cladding glasses. Furthermore, the cladding glass may also contain 1-2 weight percent of cerium oxide to minimize solarization of the glasses.

The procedure followed to produce either the core glass or the cladding glass of the preferred embodiment of the invention may be done by the following procedure.

In preparing a nominal 10 pound melt of the glasses, the ingredients, in the form of oxides and/or carbonates are filled into a preheated ceramic crucible held in a furnace at approximately 2700°F over a period of approximately 5 hours. When the filling is complete the temperature is raised to 2750° F and held for a period of 4-½ hours. The temperature in the furnace is then lowered to 2650° F where it remains for a period of 4 hours. The furnace temperature is then further lowered to 2500° F and held for a period of approximately 12 hours. The melt is then tested for consistency and if found to be acceptable the temperature is lowered to 2450° F and held for a period of 12 additional hours. The temperature is then further lowered to 2350° F and held for 16 hours. The molten glass was then drawn from the furnace into a rod which was then cooled to room temperature in an annealing oven. The apparatus utilized in producing the erbium laser material of this invention is shown in copending application Ser. No. 14,599, filed Feb. 26, 1970.

In addition, it has been found to be useful in the sensitizing of the trivalent erbium active laser ions to include minor amounts of $Cr_2O_3$ and $UO_2$ in the laser glass. It is recommended that each of these compounds be present in quantities of less than 0.2 weight percent.

It has also been found to be beneficial to the optimization of the efficiency of the erbium glass laser device to restrict the dimensions of the various components rather closely. Firstly, it is recommended that the diameter of the associated flashlamp 16 be less than or equal to the diameter of the glass core 12. Secondly, the reflectance of the output reflector 18 should be at least 80 percent. Finally, for an optimal configuration for producing 50 to 100 mJ of output power, it has been determined that the clad glass laser rod should have a maximum length of 50 millimeters and a diameter of approximately 6 millimeters. The associated cladding material should then have a thickness in the range from 0.5 to 0.75 millimeters.

An erbium glass laser device configured as set forth hereinabove has been shown to perform with over 20 percent higher efficiency than any prior art erbium glass laser device in the output power range of 50 to 100 mJ.

While there has been shown and described what is considered to be a preferred embodiment of the present invention, it will be obvious to those skilled in the art that various changes and modifications may be made therein without departing from he invention.

I claim:

1. An erbium glass laser device emitting laser energy at approximately a wavelength of 1.54 micrometers of the type formed of a silicate base glass core rod having trivalent erbium active ions and ytterbium sensitizers ions therein, the core being surrounded by a tube of a silicate base cladding glass having trivalent ytterbium and trivalent neodymium sensitizer ions therein, and associated optical pumping means, the improvement in which comprises:

the concentration of $Er_2O_3$ in the glass core being in the range of from 0.20 to 0.25 weight percent;

the concentration of $Yb_2O_3$ in the glass core being approximately 15 weight percent; and the concentration of $Nd_2O_3$ and $Yb_2O_3$ in the glass cladding each being in the range from 4.0 to 5.0 weight percent.

2. An erbium glass laser device according to claim 1, wherein the glass cladding additionally contains $Y_2O_3$ in a concentration of approximately 5 weight percent to balance thermal expansion rates between the core and cladding.

3. An erbium glass laser device according to claim 2, wherein the core and cladding are each formed of a base glass into which the active and sensitizer ions are doped, the base glass having essentially the following composition given in weight percent:

| | |
|---|---|
| $SiO_2$ | 71.4 |
| $Na_2O$ | 7.6 |
| $K_2O$ | 11.6 |
| BaO | 5.1 |
| $Al_2O_3$ | 1.6 |
| ZnO | 1.6 |
| $Li_2O$ | 1.1 |

4. An erbium glass laser device according to claim 3, wherein the following additional sensitizer ions are included within the glass cladding in the associated ranges of concentrations given in weight percent:

| | |
|---|---|
| $Cr_2O_3$ | 0–0.2 |
| $UO_2$ | 0–0.2 |

5. An erbium glass laser device according to claim 3, wherein the associated optical pumping means includes at least one flashlamp having a diameter equal to or less than the diameter of the glass core.

6. An erbium glass laser device according to claim 5, additionally including a pair of resonant cavity reflectors disposed at opposite ends of the glass core, one of the reflectors being the output reflector and having a reflectance to energy at a wavelength of 1.54 micrometers of at least 80 percent.

7. An erbium glass laser device accoridng to claim 6, wherein the glass core has a maximum length of 50 millimeters and a diameter of approximately 6 millimeters, and the glass cladding has a thickness in the range from 0.5 to 0.75 millimeters.

* * * * *